United States Patent
Matsumoto (10) Patent No.: US 11,014,559 B2
(45) Date of Patent: May 25, 2021

(54) CRUISE CONTROL DEVICE

(71) Applicant: DENSO CORPORATION, Kariya (JP)

(72) Inventor: Yusuke Matsumoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 290 days.

(21) Appl. No.: 16/323,947

(22) PCT Filed: Aug. 3, 2017

(86) PCT No.: PCT/JP2017/028244
§ 371 (c)(1),
(2) Date: Feb. 7, 2019

(87) PCT Pub. No.: WO2018/030271
PCT Pub. Date: Feb. 15, 2018

(65) Prior Publication Data
US 2019/0168758 A1    Jun. 6, 2019

(30) Foreign Application Priority Data

Aug. 11, 2016 (JP) .............................. JP2016-158304

(51) Int. Cl.
*B60W 30/165* (2020.01)
*B62D 6/00* (2006.01)
(Continued)

(52) U.S. Cl.
CPC .......... *B60W 30/165* (2013.01); *B60W 10/20* (2013.01); *B60W 40/04* (2013.01);
(Continued)

(58) Field of Classification Search
CPC .......... B60R 2300/8086; B60W 10/20; B60W 30/165; B60W 40/04; B62D 6/00;
(Continued)

(56) References Cited

U.S. PATENT DOCUMENTS

| | | | | |
|---|---|---|---|---|
| 6,269,308 B1 * | 7/2001 | Kodaka | ................. | G01S 13/931 |
| | | | | 701/301 |
| 10,227,072 B2 * | 3/2019 | Kubota | ........... | B60W 30/18163 |

(Continued)

FOREIGN PATENT DOCUMENTS

| | | | |
|---|---|---|---|
| JP | 2006-038697 A | | 2/2006 |
| JP | 2010-241264 A | | 10/2010 |
| JP | 2012-118868 A | | 6/2012 |

*Primary Examiner* — Babar Sarwar
(74) *Attorney, Agent, or Firm* — Maschoff Brennan (57) ABSTRACT

A detection ECU acquires the position of the preceding vehicle, based on image information captured by an imaging device, and generates the track of the preceding vehicle, based on the position of the preceding vehicle. The detection ECU then performs following travel control for following the preceding vehicle by calculating the amount of control for causing the own vehicle to travel along the track of the
(Continued)

preceding vehicle, and by causing the own vehicle to travel, based on the calculated amount of control. During the following travel control, if the width of the preceding vehicle is narrower than a predetermined width, the detection ECU calculates the amount of control such that the curvature variation in the track of the own vehicle is smaller than in the case where the width of the preceding vehicle is not narrower than the predetermined width.

9 Claims, 4 Drawing Sheets

(51) Int. Cl.
    *B60W 40/04*     (2006.01)
    *G08G 1/16*     (2006.01)
    *B60W 10/20*     (2006.01)
    *G01S 13/08*     (2006.01)
    *G01S 13/86*     (2006.01)

(52) U.S. Cl.
    CPC ............... *B62D 6/00* (2013.01); *G01S 13/08* (2013.01); *G01S 13/867* (2013.01); *G08G 1/16* (2013.01); *G08G 1/166* (2013.01); *B60R 2300/8086* (2013.01)

(58) Field of Classification Search
    CPC ......... G01S 13/08; G01S 13/867; G08G 1/16; G08G 1/166
    See application file for complete search history.

(56) References Cited

U.S. PATENT DOCUMENTS

| | | | |
|---|---|---|---|
| 2003/0109980 A1* | 6/2003 | Kojima | B60W 50/038 701/96 |
| 2003/0225519 A1* | 12/2003 | Miyahara | B60K 31/0008 701/301 |
| 2004/0230375 A1* | 11/2004 | Matsumoto | B60W 30/12 701/301 |
| 2006/0155469 A1* | 7/2006 | Kawasaki | G01S 13/931 701/301 |
| 2010/0052884 A1* | 3/2010 | Zeppelin | G08G 1/167 340/435 |
| 2016/0375905 A1* | 12/2016 | Park | B60W 30/16 701/96 |
| 2017/0021831 A1* | 1/2017 | De Smet | F01N 9/00 |
| 2017/0291602 A1* | 10/2017 | Newman | G08G 1/16 |
| 2017/0291603 A1* | 10/2017 | Nakamura | B60W 30/095 |
| 2017/0349172 A1* | 12/2017 | Kubota | B60W 30/18163 |
| 2018/0240258 A1* | 8/2018 | Kosaka | G06T 3/20 |
| 2019/0071075 A1* | 3/2019 | Mimura | G08G 1/16 |
| 2019/0100199 A1* | 4/2019 | Ueda | G05D 1/0212 |

\* cited by examiner

MAP FOR COMPUTING REQUIRED AMOUNT OF TORQUE

CRUISE CONTROL DEVICE

CROSS-REFERENCE TO RELATED APPLICATION

The present application is a national stage application of PCT Application No. PCT/JP2017/028244, filed on Aug. 3, 2017, which claims priority to Japanese Patent Application No. 2016-158304 filed on Aug. 11, 2016, the contents of which are incorporated herein by reference.

TECHNICAL FIELD

The present disclosure relates to a cruise control device for causing the own vehicle to follow a preceding vehicle which is traveling ahead of the own vehicle in the traveling direction.

BACKGROUND ART

Adaptive cruise control (ACC) has been accomplished which selects a preceding vehicle from among other vehicles located around the vehicle in the traveling direction ahead of the vehicle, and causes the vehicle to follow the preceding vehicle.

In order to cause the vehicle to follow the selected preceding vehicle, the ACC controls acceleration and deceleration such that the vehicle keeps a certain distance from the preceding vehicle.

In the absence of any preceding vehicle, the vehicle is controlled to maintain a steady speed as set by the driver or as specified by the speed limit on the road.

As a technique related to the ACC, PTL 1 discloses a cruise control device.

In the event that the cruise control device described in PTL 1 detects the preceding vehicle meandering (rocking from side to side) while the level of consciousness of the preceding vehicle's driver is less than a threshold value, the cruise control device calculates the amount of travel control by utilizing the position information of the preceding vehicle obtained prior to the detection of meandering.

The vehicle is thus prevented from following the meandering preceding vehicle, whereby the vehicle itself can avoid meandering.

CITATION LIST

Patent Literature

PTL 1: JP 2010-241264 A

SUMMARY OF THE INVENTION

The technique described in PTL 1 detects the preceding vehicle meandering, based on the level of consciousness of the preceding vehicle's driver. However, the preceding vehicle may also meander when the level of consciousness of the preceding vehicle's driver is greater than the threshold value. If the ACC is performed in such a case, the own vehicle may meander.

The present disclosure has been made in order to solve the above problem, and the main object thereof is to provide a cruise control device capable of reducing or preventing the own vehicle from meandering which is due to a meander of the preceding vehicle while the own vehicle is automatically following the preceding vehicle.

A first disclosure relates to a cruise control device applied to a vehicle including an imaging device that captures a view ahead of an own vehicle in a traveling direction. The cruise control device includes a position acquisition unit that acquires a position of a preceding vehicle traveling ahead of the own vehicle in the traveling direction, based on image information captured by the imaging device, a track generation unit that generates a track of the preceding vehicle, based on the position of the preceding vehicle acquired by the position acquisition unit, and a following travel control unit that performs following travel control for following the preceding vehicle by calculating an amount of control for causing the own vehicle to travel along the track of the preceding vehicle generated by the track generation unit, and by causing the own vehicle to travel, based on the calculated amount of control. If a width of the preceding vehicle is narrower than a predetermined width, the following travel control unit calculates the amount of control such that a curvature variation of a track of the own vehicle under the following travel control is smaller than in a case where the width of the preceding vehicle is not narrower than the predetermined width.

The narrower the vehicle width is, the greater the ranges of allowable lateral movement within a lane is. Vehicles having greater ranges of allowable lateral movement within a lane are more likely to travel by deviating from the middle of the lane. Therefore, when the own vehicle is automatically following the preceding vehicle having a narrow width, the own vehicle may deviate from the middle of the lane along the track of the preceding vehicle. In some cases, the own vehicle may even move unsteadily from side to side along the lane.

As a countermeasure thereto, if the width of the preceding vehicle is narrower than the predetermined width, the following travel control unit calculates the amount of control such that the curvature variation of the track of the own vehicle under the following travel control is smaller than in the case where the width of the preceding vehicle is not narrower than the predetermined width. Consequently, if the preceding vehicle has a width narrower than the predetermined width and thus moves unsteadily from side to side along the lane, curvature fluctuations in the track of the own vehicle under the following travel control can be reduced or prevented, as compared with the case where the width of the preceding vehicle is not narrower than the predetermined width. As a result, even when the preceding vehicle that the own vehicle is following under the following travel control moves unsteadily from side to side along the lane due to its narrow width, the own vehicle can be reduced or prevented from moving unsteadily from side to side along the track of the preceding vehicle.

A second disclosure is a cruise control device applied to a vehicle including an imaging device that captures a view ahead of an own vehicle in a traveling direction. The cruise control device includes, a position acquisition unit that acquires a position of a preceding vehicle traveling ahead of the own vehicle in the traveling direction, based on image information captured by the imaging device, a track generation unit that generates a track of the preceding vehicle, based on the position of the preceding vehicle acquired by the position acquisition unit, a following travel control unit that performs following travel control for following the preceding vehicle by calculating an amount of control for causing the own vehicle to travel along the track of the preceding vehicle generated by the track generation unit and by causing the own vehicle to travel, based on the calculated amount of control, and a broad classification unit that broadly classifies the preceding vehicle as a motorcycle or other type of vehicle. If the preceding vehicle is classified as a motorcycle by the broad classification unit, the following travel control unit calculates the amount of control such that a curvature variation of a track of the own vehicle under the following travel control is smaller than in a case where the preceding vehicle is classified as another type of vehicle by the broad classification unit.

Motorcycles are much narrower and have greater ranges of allowable lateral movement within a lane than any other vehicles allowed to travel on roads. Therefore, the own vehicle that is following a motorcycle is liable to move unsteadily from side to side along the track of the motorcycle. To avoid such a situation, the broad classification unit is provided to broadly classify the preceding vehicle as a motorcycle or other type of vehicle. If the preceding vehicle is classified as a motorcycle by the broad classification unit, the amount of control is calculated such that the curvature variation of the track of the own vehicle under the following travel control is smaller than in the case where the preceding vehicle is classified as another type of vehicle by the broad classification unit. Consequently, the own vehicle can be reduced or prevented from moving unsteadily from side to side when following a motorcycle.

BRIEF DESCRIPTION OF DRAWINGS

Referring to the accompanying drawings, specific description will be provided below to clarify the above object and other objects, characteristics and advantageous effects of the present disclosure.

In the drawings.

DESCRIPTION OF EMBODIMENTS

Figure 1:
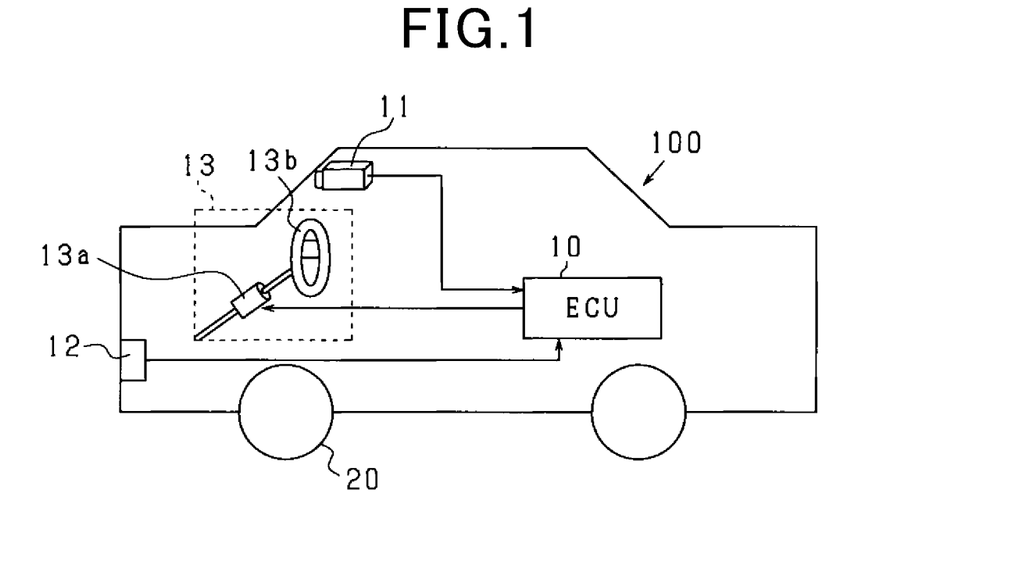
FIG. 1 is a schematic configuration diagram illustrating a preceding vehicle following system according to the present embodiment.

Referring to FIG. 1, a description will be given of a preceding vehicle following system 100 applied to a vehicle that travels with its steering wheels 20 rotationally driven. The preceding vehicle following system 100 includes a detection ECU 10, an imaging device 11, a radar device 12, and an electrically assisted power steering 13.

The imaging device 11 includes, for example, a CCD camera, a CMOS image sensor, a near-infrared camera, or the like. In this case, the imaging device 11 is attached to the own vehicle at a certain height in the width-directional center thereof to capture, from a high perspective, a region extending over a certain range of angles in front of the own vehicle. The imaging device 11 then outputs captured image information to the detection ECU 10. The imaging device 11 may be a single lens camera or a stereo camera.

The radar device 12 is a known millimeter wave radar, for example, that uses a high frequency signal in the millimeter waveband as transmission waves. The radar apparatus 21 is disposed at the front end part of the own vehicle, and defines a range within a predetermined detection angle as a detectable range. In the detectable range, the position of a target (referred to as radar-detected object) is detected. Specifically, the radar device 12 transmits probe waves at predetermined intervals, and receives reflected waves through a plurality of antennas. The radar device 12 calculates the distance to the radar-detected object by the transmission time of the probe waves and the reception time of the reflection waves. The radar device 12 also calculates the relative speed of the radar-detected object using the Doppler-shifted frequency of reflected waves reflected by the radar-detected object. In addition, the radar device 12 calculates the azimuth of the radar-detected object using the phase difference between reflected waves received by the plurality of antennas. If the position and azimuth of the radar-detected object can be calculated, the position of the radar-detected object relative to the own vehicle and the relative distance between the radar-detected object and the own vehicle can be specified. The radar device 12 transmits probe waves, receives reflected waves, calculates relative position, relative distance, and relative speed, and transmits the calculated relative position, relative distance, and relative speed to the detection ECU 10 at predetermined intervals.

The detection ECU 10 is connected to the imaging device 11 and to the radar device 12. The detection ECU 10 is a computer including a CPU, RAM. ROM, I/O, and the like. The CPU executes programs installed in the ROM to realize various functions. Therefore, the detection ECU 10 corresponds to a radar-detected object position detection unit, an image-detected object position detection unit, a position acquisition unit, a path generation unit, a following travel control unit, and a broad classification unit.

In the present embodiment, a plurality of programs is installed in the ROM. Specifically, a same object determination program, a white line detection program, and a following travel control program are installed in the ROM.

Based on information on a radar-detected object and information on an image-detected object, the same object determination program determines whether these objects indicate the same object.

Specifically, the detection ECU 10 establishes a correlation between a radar-detected object position that is a position obtained from a radar-detection target and an image-detection target position that is a feature point obtained from an image-detection target. Specifically, if these positions are located close to each other, they are correlated to each other as being based on an identical target. If an image-detected object position is located near a radar-detected object position (in the present embodiment, if the distance between a radar-detected object position and an image-detected object position is within a predetermined range), there is a high probability that the object is actually located in the radar-detected object position. The state in which the position of a target is accurately obtained by the radar device 12 and the imaging device 11 is referred to as a fusion state. In the present embodiment, if it is determined that a radar-detected object and an image-detected object are in a fusion state, the preceding vehicle is recognized as being located in the radar-detected object position.

In the white line detection program, the detection ECU 10 detects white lines from image information captured by the imaging device 11. White lines are dividing lines that define the lane where the own vehicle is traveling (hereinafter referred to as own lane).

Specifically, the imaging device 11 extracts changing points of the contrast (edge intensity) between a white line, which defines a lane, and a road surface as edge candidate points, based on luminance of the image captured by the imaging device 11. Then, a candidate line of a boundary line is extracted from the series of extracted edge candidate points. More specifically, image information acquired from the imaging device 11 is continuously processed at a predetermined sampling period, and a plurality of points whose luminance rapidly changes in the horizontal direction of the image are extracted as edge candidate points. Then, Hough transformation is applied to the series of extracted edge candidate points to acquire a series of edge candidate points, and a plurality of candidate lines having a series of acquired edge candidate points as left and right contours are extracted.

Then, with respect to each of the plurality of candidate lines, the degree of having the feature as the boundary line (white line) for defining a lane is calculated at each edge candidate point. Among these candidate lines, one having a larger degree of feature is detected as a white line for defining a lane. Among the detected white lines, the left and right white lines which are approaching the own vehicle, and are arranged so as to include the own vehicle, are recognized as white line for defining own lane.

The following travel control program causes the detection ECU 10 to select, from among preceding vehicles recognized by the same object determination program, the preceding vehicle located in the own lane (hereinafter referred to as estimated own lane) estimated using white lines detected by the white line detection program. The following travel control program then causes the detection ECU 10 to detect information on the position of the selected preceding vehicle at predetermined intervals, and to store the positional information in the RAM. In this case, if information on the position of the preceding vehicle can be detected continuously for a predetermined period of time, the preceding vehicle is presumed to continue traveling along the route that the own vehicle plans to take. Therefore, if information on the position of the preceding vehicle has been detected continuously for a predetermined period of time, the preceding vehicle is set as a target vehicle to follow, and following travel control for causing the own vehicle to follow the target vehicle is performed.

First, a track of the target vehicle is generated as the track of the target vehicle using history information about the position of the target vehicle stored in the RAM. Specifically, all the positions of the target vehicle that have been detected and stored in the RAM are connected in a straight line or arc to generate the track of the target vehicle.

Then, a steering process is performed for controlling the traveling direction of the own vehicle so that the own vehicle travels along the generated track of the target vehicle. Therefore, the own vehicle is equipped with the electrically assisted power steering 13 as a safety device that is driven by a steering command from the detection ECU 10. The detection ECU 10 and the electrically assisted power steering 13 correspond to the following travel control unit.

Figure 2:
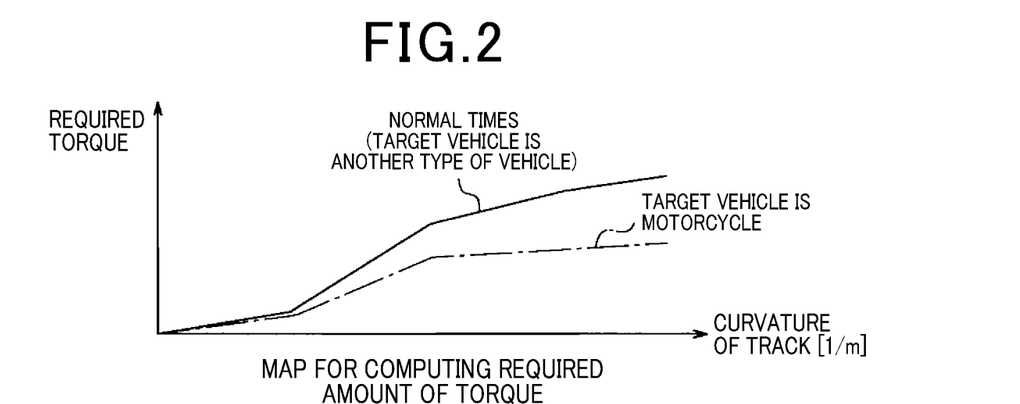
FIG. 2 is a diagram illustrating a map that is referred to during following travel control, indicating the relation between the curvature of the track of the preceding vehicle and the required torque of a steering electric motor.

The electric power steering 13 includes a steering 13b for operating a steering angle of the steering wheel 20 that the vehicle has, and a steering motor 13a. The steering electric motor 13a generates torque for operating the steering 13b during following travel control. In the present embodiment, the map illustrated in FIG. 2 is stored in advance in the ROM. The map indicates the relation between the curvature of the track of the target vehicle and the torque that should be outputted by the steering electric motor 13a (hereinafter referred to as required torque). During a period of following travel, referring to the map illustrated in FIG. 2, the required torque of the steering electric motor 13a is computed from the curvature of the track of the target vehicle. In the map illustrated in FIG. 2, the required torque of the steering electric motor 13a increases as the curvature of the track of the target vehicle increases. Therefore, the steering angle for the steering wheels 20 can be increased as the curvature of the track of the target vehicle increases. The curvature of the track of the target vehicle is calculated using the Kalman filter.

Figure 3:
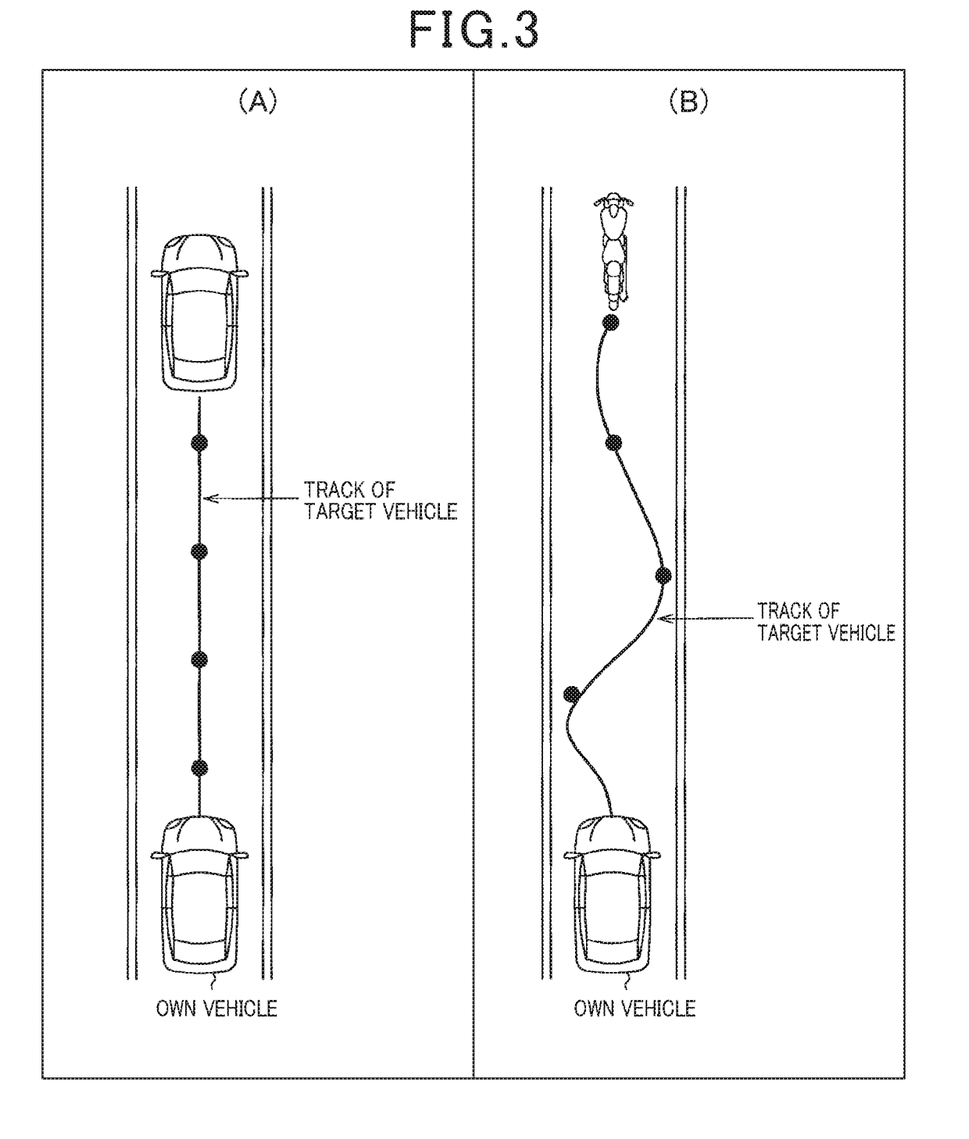
FIG. 3(A) and FIG. 3(B) illustrate the difference between the tracks of a motorcycle and another type of vehicle traveling on lanes with the same width.

Vehicles other than motorcycles have smaller ranges of allowable lateral movement within the lane than that of motorcycles, and thus are likely to travel substantially through the middle of the lane as illustrated in the drawing of FIG. 3(A). Therefore, when a vehicle other than the motorcycle is set as the target vehicle for following travel control, the own vehicle can also be expected to travel substantially through the middle of the lane. In contrast, if the preceding vehicle traveling in the own lane is a motorcycle that is much narrower than other vehicles allowed to travel on roads, the motorcycle is presumed to deviate from the middle of the lane as illustrated in the drawing of FIG. 3(B) because the motorcycle has a great range of allowable lateral movement within the lane. Therefore, when the motorcycle is set as the target vehicle for following travel control, the own vehicle is liable to move unsteadily from side to side along the track of the motorcycle.

To avoid such a situation, the ROM further includes a vehicle type identification program. In addition, another graph is added to the map of FIG. 2 stored in advance in the ROM. This additional graph indicates the relation between the curvature of the track of the target vehicle and the required torque of the steering electric motor 13a for the case that the target vehicle is the motorcycle. Specifically, the graph for the case that the target vehicle is another type of vehicle (normal times) is corrected in a manner that reduces the required torque of the steering electric motor 13a, and the corrected graph is added to the map as a graph to be referred to when the target vehicle is a motorcycle.

The vehicle type identification program causes the detection ECU 10 to perform pattern matching on feature points extracted from image information acquired from the imaging device 11 to identify the target vehicle as a motorcycle or other type of vehicle.

In response to the vehicle type identification program identifying the target vehicle as a motorcycle, the following travel control program causes the detection ECU 10 to compute, from the curvature of the track of the target vehicle referring to the map illustrated in FIG. 2, the required torque of the steering electric motor 13a in the case that the following vehicle is the motorcycle.

Figure 4:
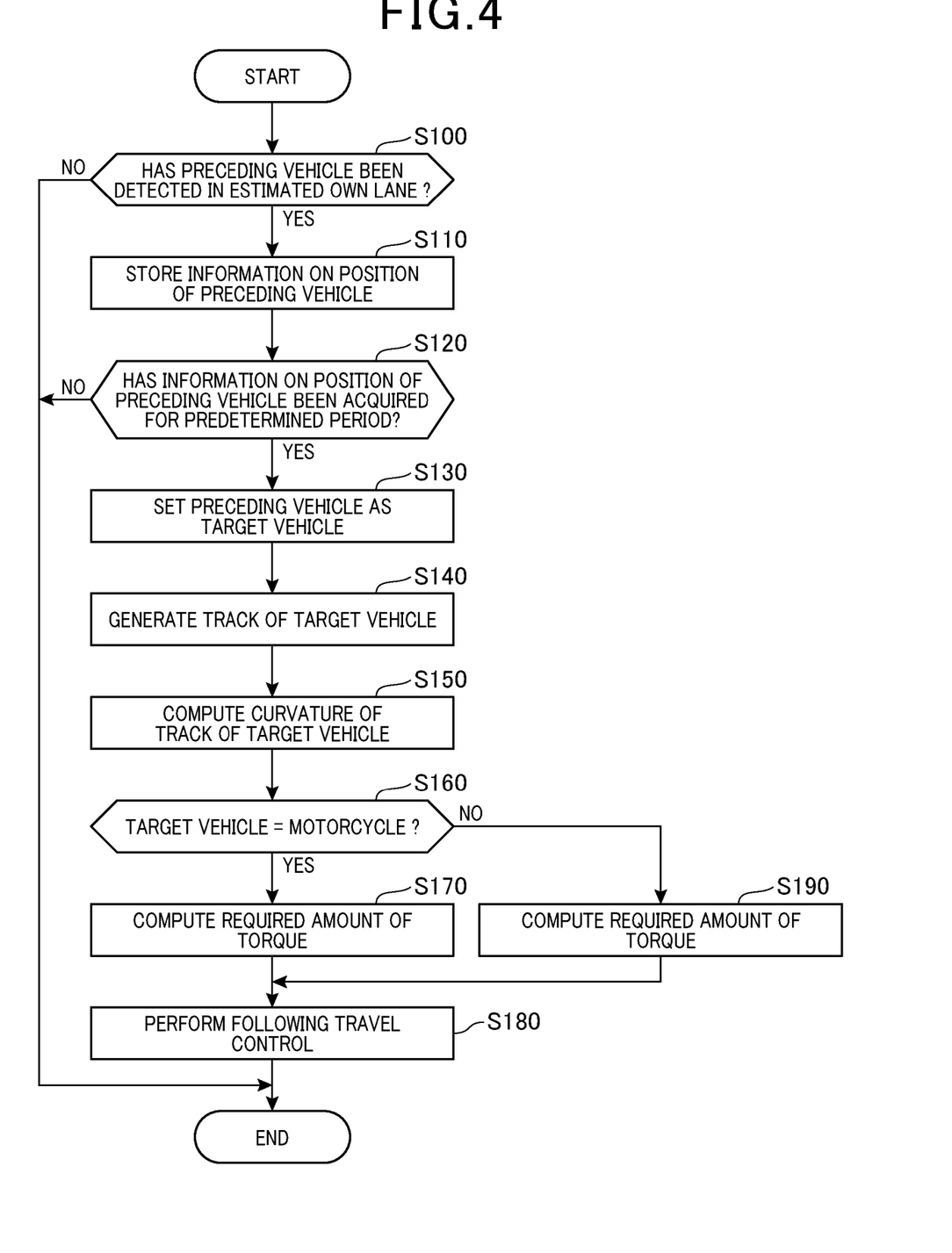
FIG. 4 is a flowchart of the control performed by a detection ECU according to the present embodiment.

In the present embodiment, the following travel control illustrated in FIG. 4 is performed by the detection ECU 10 as described below. The following travel control illustrated in FIG. 4 is cyclically performed by the detection ECU 10 while the detection ECU 10 is in an on state.

First, at step S100, the detection ECU 10 determines whether the preceding vehicle has been detected in the estimated own lane. If the detection ECU 10 determines that the preceding vehicle has not been detected in the estimated own lane (No at step S100), control is terminated. If the detection ECU 10 determines that the preceding vehicle has been detected in the estimated own lane (Yes at step S100), control proceeds to step S110.

At step S110, the detection ECU 10 stores the position information of the preceding vehicle detected at step S100.

At step S120, the detection ECU 10 determines whether the position information of the preceding vehicle has been successfully stored for a predetermined period of time. If the detection ECU 10 determines that the position information of the preceding vehicle has not been successfully stored for a predetermined period of time (No at S120), control is finished. If the detection ECU 10 determines that the position information of the preceding vehicle has been successfully stored for a predetermined period of time (Yes at S120), the control proceeds to step S130, where the preceding vehicle is set as the following vehicle.

At step S140, the detection ECU 10 generates the track of the target vehicle using history of the position information of the stored target vehicle. At step S150, the curvature of the track of the target vehicle generated at step S140 is computed.

At step S160, the detection ECU 10 determines whether the target vehicle is a motorcycle. If the detection ECU 10 determines that the target vehicle is a motorcycle (Yes at S160), control proceeds to step S170. At step S170, referring to the map illustrated in FIG. 2, the required torque of the steering electric motor 13a in the case that the target vehicle is a motorcycle is computed from the curvature of the track of the target vehicle computed at step S150. At step S180, following travel control is performed by causing the steering electric motor 13a to output torque such that the required torque computed at step S170 or step S190 (described later) is satisfied. Then, the present control is terminated.

If the detection ECU 10 determines that the target vehicle is not a motorcycle but is another type of vehicle (No at S160), control proceeds to step S190. At step S190, referring to the map illustrated in FIG. 2, the required torque of the steering electric motor 13a in the case that the target vehicle is not a motorcycle but is another type of vehicle is computed from the curvature of the track of the target vehicle computed at step S150. Then, control proceeds to step S180.

According to the aforementioned configuration, the present embodiment provides the advantageous effects described below.

The required torque of the steering electric motor 13a to be computed when the target vehicle is identified as a motorcycle is smaller than the required torque of the steering electric motor 13a to be computed when the target vehicle is another type of vehicle. Consequently, if the target vehicle is identified as a motorcycle, the steering electric motor 13a can output a smaller torque than if the target vehicle is identified as another type of vehicle, whereby the steering angle for the steering wheels 20 can be reduced or prevented from increasing with an increase in the curvature of the track of the target vehicle. In this case, curvature fluctuations of the track of the own vehicle under the following travel control can be prevented, as compared with the case where the target vehicle is identified as another type of vehicle. Thus, in the case where the target vehicle is a motorcycle and thus moves unsteadily from side to side along the own lane, the own vehicle can be reduced or prevented from moving unsteadily from side to side along the track of the target vehicle.

If the preceding vehicle traveling ahead in the estimated own lane has been detected for a predetermined period in image information which is outputted from the imaging device 11, the preceding vehicle is set as the target vehicle, and following travel control for following the target vehicle is performed. Consequently, the following travel control is performed such that the own vehicle follows the preceding vehicle presumed to continue traveling along the route that the own vehicle plans to take. Therefore, the following travel control can be performed for a long period.

If a radar-detected object and an image-detected object located ahead of the own vehicle have a predetermined positional relation, the preceding vehicle is detected. Therefore, the accuracy of the position of the detected preceding vehicle relative to the own vehicle is high, enabling the own vehicle to follow the target vehicle more accurately.

The following modifications may be made to the above embodiment.

In the aforementioned embodiment, the fusion determination is made using the radar device 12 and the imaging device 11. However, fusion determination is not essential for the above following travel control. For example, the preceding vehicle following system 100 that includes the imaging device 11 but does not include the radar device 12 may perform the above following travel control. In this case, all types of information that are acquired from the radar device 12 in the above embodiment, such as the position information of the preceding vehicle, are acquired through an analysis of image information captured by the imaging device 11.

In the above embodiment, if information on the position of the preceding vehicle traveling in the estimated own lane has been detected for a predetermined period, following travel control is performed. However, following travel control does not necessarily be triggered by continuous detection of the position information of the preceding vehicle traveling in the estimated own lane, but may, for example, be triggered by detection of the preceding vehicle traveling in the estimated own lane.

In the above embodiment, the required torque of the steering electric motor 13a is computed from the curvature of the track of the target vehicle referring to the map illustrated in FIG. 2. Alternatively, a map indicating the relation between the curvature of a track of the target vehicle and the steering angle for the steering wheels 20 may be stored instead of the map illustrated in FIG. 2. Then, during a period of following traveling, the steering angle for the steering wheels 20 may be computed from the curvature of the track of the target vehicle referring to the map. In this case, the required torque of the steering electric motor 13a is computed, based on the computed steering angle of the steering wheels 20. This configuration provides the same functions and effects as those of the aforementioned embodiment.

In the above embodiment, in response to the vehicle type identification program identifying the target vehicle as a motorcycle, the required torque of the steering electric motor 13a in the case that the target vehicle is a motorcycle is computed from the curvature of the track of the target vehicle referring to the map illustrated in FIG. 2. Alternatively, the required torque of the steering electric motor 13a in the case that the target vehicle is another type of vehicle may be computed from the curvature of the track of the target vehicle referring to the map illustrated in FIG. 2, and the computed required torque may be corrected downward if the vehicle type identification program identifies the target vehicle as a motorcycle. With such a configuration, if the target vehicle is a motorcycle, the required torque is calculated such that the curvature variation in the track of the own vehicle is smaller than the case that the target vehicle is another type of vehicle.

Figure 5:
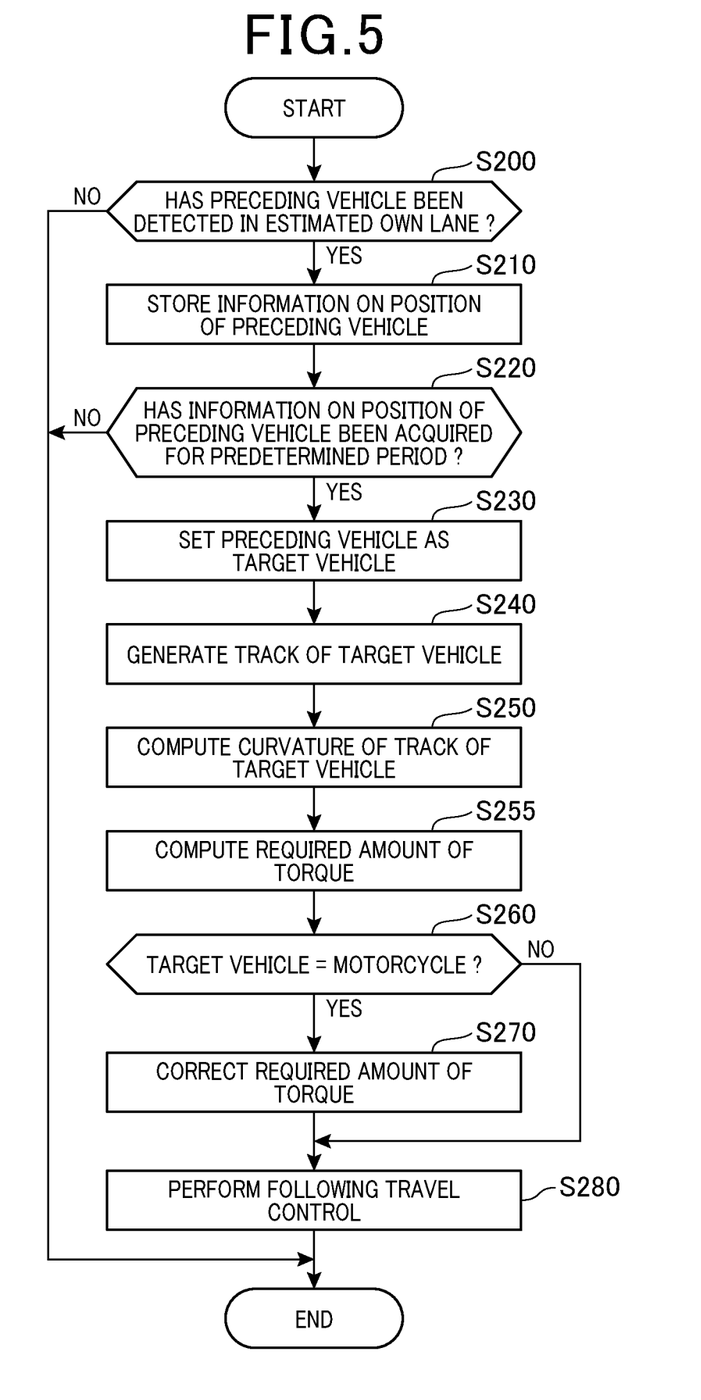
FIG. 5 is a flowchart of the control performed by a detection ECU according to another example.

FIG. 5 is a partial modification of the flowchart of FIG. 4. Specifically, step S190 in FIG. 4 is deleted. Step S255 is inserted between step S250 corresponding to step S150 and step S260 corresponding to step S160. Step S270 is inserted in place of step S170.

After step S250, referring to the map illustrated in FIG. 2, the required torque of the steering electric motor 13a in normal times is computed at step S255 from the curvature of the track of the target vehicle computed at step S250. Then, if Yes at step S260, control proceeds to step S270, where the required torque computed at step S255 is corrected downward, and control proceeds to step S280 which corresponds to step S180. If No at step S260, control proceeds to step S280.

Other steps S200, 210, 220, 230, and 240 in FIG. 5 are respectively the same as steps S100, 110, 120, 130, and 140 of FIG. 4.

The above control eliminates the need for adding, to the map illustrated in FIG. 2, a graph indicating the relation between the curvature of the track of the target vehicle and the required torque of the steering electric motor 13a for the case that the target vehicle is a motorcycle. As a result, the capacity of the ROM can be saved.

In the above embodiment, the required torque to be computed varies depending on whether the target vehicle is a motorcycle or other type of vehicle. Alternatively, if the width of the target vehicle is narrower than a predetermined width, computations may be performed such that the required torque of the steering electric motor 13a is smaller as compared with the case where the width of the target vehicle is not narrower than the predetermined width.

Besides motorcycles, some four-wheel vehicles have narrow widths. If there is a four-wheel vehicle having narrow width, a range of allowable lateral movement within a lane is greater. Therefore, if the narrow four-wheel vehicle is set as the target vehicle, the own vehicle may deviate from the middle of the lane. As a countermeasure thereto, as described in this alternative example, if the width of the target vehicle is narrower than a predetermined width, computations are performed such that the required torque of the steering electric motor 13a is smaller, as compared with the case where the width of the target vehicle is not narrower than the predetermined width. Consequently, if the target vehicle has a width narrower than the predetermined width and thus moves unsteadily from side to side along the lane, curvature fluctuations in the track of the own vehicle under the following travel control can be reduced or prevented, as compared with a case where the width of the target vehicle is not narrower than the predetermined width. As a result, even when the target vehicle under the following travel control moves unsteadily from side to side along the lane due to its narrow width, the own vehicle can be reduced or prevented from moving unsteadily from side to side along the track of the target vehicle. Calculation may be performed such that the required torque (amount of control) of the steering electric motor 13a decreases as the width of the target vehicle (preceding vehicle) decreases.

Instead of the detection ECU 10 and the electrically assisted power steering 13, only the detection ECU 10 may constitute the following travel control unit.

The present disclosure has been described by way of examples; however, the present disclosure should not be construed as being limited to these examples or structures. The scope of the present disclosure should encompass various modifications or equivalents. In addition, various combinations or forms of elements and even other combinations or forms including one or more elements or one or less component fall within the scope and spirits of the present disclosure.

The invention claimed is:

1. A cruise control device applied to a vehicle including an imaging device that captures a view ahead of an own vehicle in a traveling direction, the cruise control device comprising:
a position acquisition unit that acquires a position of a preceding vehicle traveling ahead of the own vehicle in the traveling direction, based on image information captured by the imaging device;
a track generation unit that generates a track of the preceding vehicle, based on the position of the preceding vehicle acquired by the position acquisition unit; and
a following travel control unit that performs following travel control for following the preceding vehicle by calculating an amount of control for causing the own vehicle to travel along the track of the preceding vehicle generated by the track generation unit, and by causing the own vehicle to travel, based on the calculated amount of control, wherein:
if a width of the preceding vehicle is narrower than a predetermined width, the following travel control unit calculates the amount of control such that a curvature variation of a track of the own vehicle under the following travel control is smaller than in a case where the width of the preceding vehicle is not narrower than the predetermined width.

2. The cruise control device according to claim 1, comprising:
a broad classification unit that broadly classifies the preceding vehicle as a motorcycle or other type of vehicle, wherein:
if the preceding vehicle is classified as the motorcycle by the broad classification unit, the following travel control unit calculates the amount of control such that the curvature variation of the track of the own vehicle under the following travel control is smaller than in a case where the preceding vehicle is classified as another type of vehicle by the broad classification unit.

3. The cruise control device according to claim 1, wherein:
if the preceding vehicle has been detected for a predetermined period in the image information outputted from the imaging device, the following travel control unit performs the following travel control.

4. The cruise control device according to claim 1, wherein:
the own vehicle includes an electrically assisted power steering that controls the traveling direction of the own vehicle according to output torque of a motor, and
the amount of control corresponds to the output torque of the motor.

5. The cruise control device according to claim 1, comprising:
a radar device that transmits probe waves forward from the own vehicle in the traveling direction, and receives reflected waves reflected by an object;
a radar-detected object position acquisition unit that detects a position of a radar-detected object which is detected by information based on the reflected waves acquired by the radar device; and an image-detected object position acquisition unit that detects a position of an image-detected object which is detected by the image information acquired by the imaging device, wherein:
if the radar-detected object and the image-detected object located ahead of the own vehicle have a predetermined positional relation, the preceding vehicle is detected.

6. A cruise control device applied to a vehicle including an imaging device that captures a view ahead of an own vehicle in a traveling direction, the cruise control device comprising:
a position acquisition unit that acquires a position of a preceding vehicle traveling ahead of the own vehicle in the traveling direction, based on image information captured by the imaging device;
a track generation unit that generates a track of the preceding vehicle, based on the position of the preceding vehicle acquired by the position acquisition unit;
a following travel control unit that performs following travel control for following the preceding vehicle by calculating an amount of control for causing the own vehicle to travel along the track of the preceding vehicle generated by the track generation unit and by causing the own vehicle to travel, based on the calculated amount of control; and
a broad classification unit that broadly classifies the preceding vehicle as a motorcycle or other type of vehicle, wherein:
if the preceding vehicle is classified as the motorcycle by the broad classification unit, the following travel control unit calculates the amount of control such that an curvature variation of a track of the own vehicle under the following travel control is smaller than in a case where the preceding vehicle is classified as another type of vehicle by the broad classification unit.

7. The cruise control device according to claim 6, wherein:
if the preceding vehicle has been detected for a predetermined period in the image information outputted from the imaging device, the following travel control unit performs the following travel control.

8. The cruise control device according to claim 6, wherein:
the own vehicle includes an electrically assisted power steering that controls the traveling direction of the own vehicle according to output torque of a motor, and
the amount of control corresponds to the output torque of the motor.

9. The cruise control device according to claim 6, comprising:
a radar device that transmits probe waves forward from the own vehicle in the traveling direction, and receives reflected waves reflected by an object;
a radar-detected object position acquisition unit that detects a position of a radar-detected object which is detected by information based on the reflected waves acquired by the radar device; and
an image-detected object position acquisition unit that detects a position of an image-detected object which is detected by the image information acquired by the imaging device, wherein:
if the radar-detected object and the image-detected object located ahead of the own vehicle have a predetermined positional relation, the preceding vehicle is detected.

* * * * *